US010581546B2

(12) United States Patent
Mizutani et al.

(10) Patent No.: US 10,581,546 B2
(45) Date of Patent: Mar. 3, 2020

(54) TRANSMITTER, TRANSMISSION METHOD, AND RECEIVER BASED ON TIME-DOMAIN WINDOWS

(71) Applicant: KYOTO UNIVERSITY, Kyoto (JP)

(72) Inventors: Keiichi Mizutani, Kyoto (JP); Hiroshi Harada, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 16/066,107

(22) PCT Filed: Dec. 28, 2016

(86) PCT No.: PCT/JP2016/005257
§ 371 (c)(1),
(2) Date: Jun. 26, 2018

(87) PCT Pub. No.: WO2017/119050
PCT Pub. Date: Jul. 13, 2017

(65) Prior Publication Data
US 2019/0013890 A1 Jan. 10, 2019

(30) Foreign Application Priority Data
Jan. 8, 2016 (JP) ................................ 2016-002695

(51) Int. Cl.
*H04J 11/00* (2006.01)
*H04J 1/00* (2006.01)
(Continued)

(52) U.S. Cl.
CPC ........ *H04J 11/0023* (2013.01); *H04B 1/0064* (2013.01); *H04J 1/00* (2013.01);
(Continued)

(58) Field of Classification Search
CPC ....... H04B 1/0064; H04J 11/0023; H04J 1/00; H04L 25/03343; H04L 25/03821;
(Continued)

(56) References Cited

U.S. PATENT DOCUMENTS 8,908,794 B2 * 12/2014 Futatsugi ............... H04J 11/003
375/259
8,908,796 B1 * 12/2014 Guvenkaya ......... H04L 27/2626
375/296
(Continued)

FOREIGN PATENT DOCUMENTS

| JP | 2015-207834 A | 11/2015 |
|----|---------------|---------|
| WO | WO 2012/090327 A1 | 7/2012 |
| WO | WO 2014/108947 A1 | 7/2014 |

*Primary Examiner* — Chi H Pham
*Assistant Examiner* — Weibin Huang
(74) *Attorney, Agent, or Firm* — Paratus Law Group, PLLC

(57) ABSTRACT

A transmitter using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system. One or a plurality of transmission units are provided in parallel, and one or a plurality of transmission processing units are provided in parallel. The transmission processing unit has an inverse fast Fourier transforming circuit or a discrete inverse Fourier transforming circuit, a GI and overlap margin (OM) insertion circuit, and a time-domain windowing processing unit. The time-domain windowing processing unit multiplies a universal time-domain window function in accordance with a spectrum mask and transport electric power which are required in each channel, thereby suppressing out-of-band radiation electric power
(Continued)

every channel. A kind and a window transition duration of the time-domain window function can be arbitrarily set every channel.

6 Claims, 9 Drawing Sheets

(51) Int. Cl.
    *H04L 25/03*     (2006.01)
    *H04L 27/26*     (2006.01)
    *H04B 1/00*     (2006.01)

(52) U.S. Cl.
    CPC .. *H04L 25/03343* (2013.01); *H04L 25/03821* (2013.01); *H04L 25/03834* (2013.01); *H04L 27/2626* (2013.01); *H04L 27/2628* (2013.01); *H04L 27/2656* (2013.01)

(58) Field of Classification Search
    CPC ........... H04L 25/03834; H04L 27/2626; H04L 27/2628; H04L 27/2656
    See application file for complete search history.

(56) References Cited

U.S. PATENT DOCUMENTS

| | | | |
|---|---|---|---|
| 9,455,760 B1* | 9/2016 | Dick | H03F 1/3247 |
| 2012/0140849 A1* | 6/2012 | Bercovich | H04L 25/0204 |
| | | | 375/296 |
| 2012/0213312 A1* | 8/2012 | Futatsugi | H04L 27/3411 |
| | | | 375/296 |
| 2012/0249233 A1* | 10/2012 | Farahani Samani | |
| | | | H03F 1/3247 |
| | | | 330/75 |
| 2013/0281148 A1* | 10/2013 | Seyama | H04W 52/243 |
| | | | 455/522 |
| 2015/0333944 A1* | 11/2015 | Bae | H04L 25/03821 |
| | | | 375/296 |
| 2015/0341201 A1* | 11/2015 | Funada | H04L 25/03834 |
| | | | 375/260 |
| 2016/0219506 A1* | 7/2016 | Pratt | H04W 52/0209 |
| 2017/0033949 A1* | 2/2017 | Eitan | H04L 25/0204 |

* cited by examiner

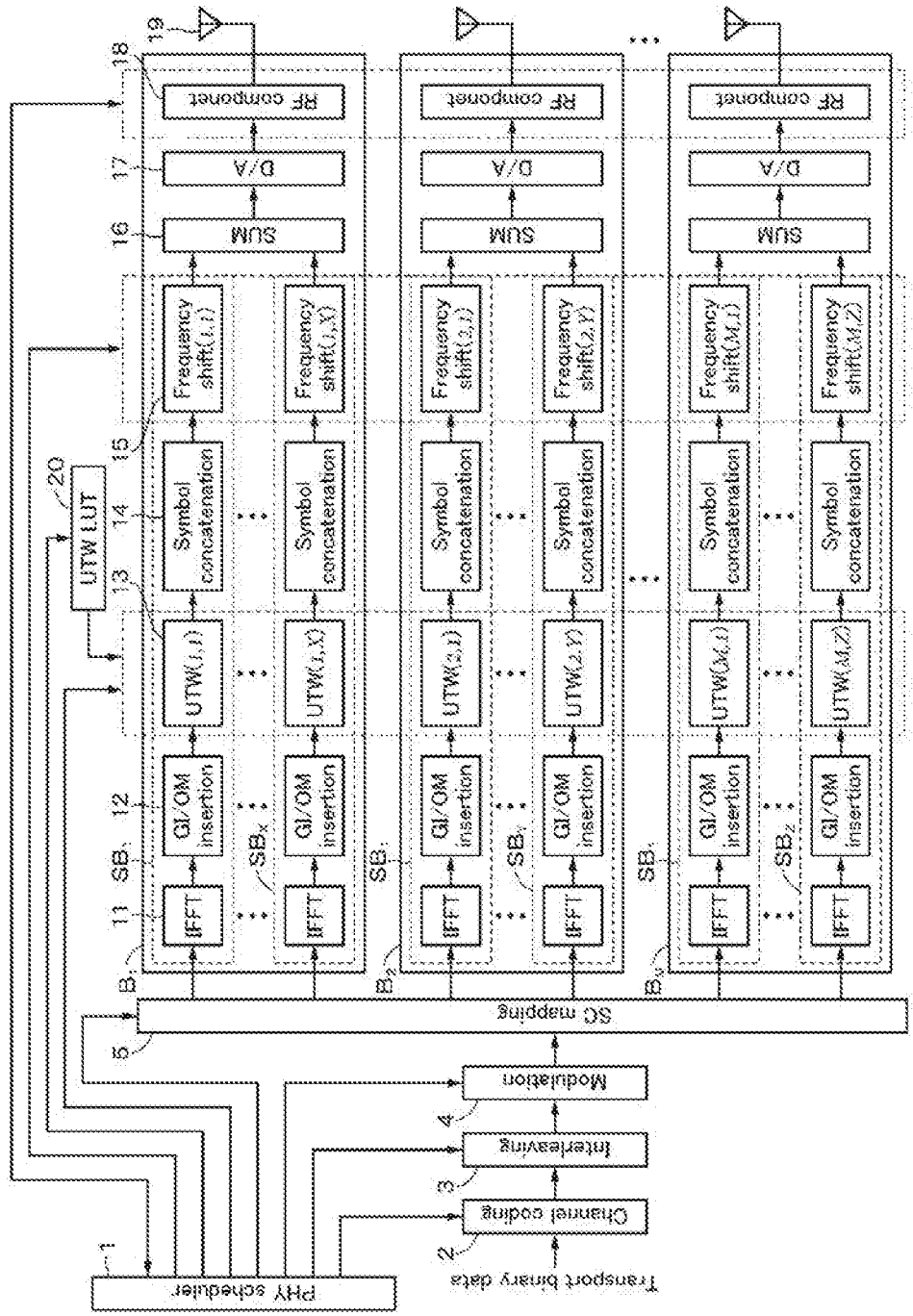
[ Fig. 1 ]

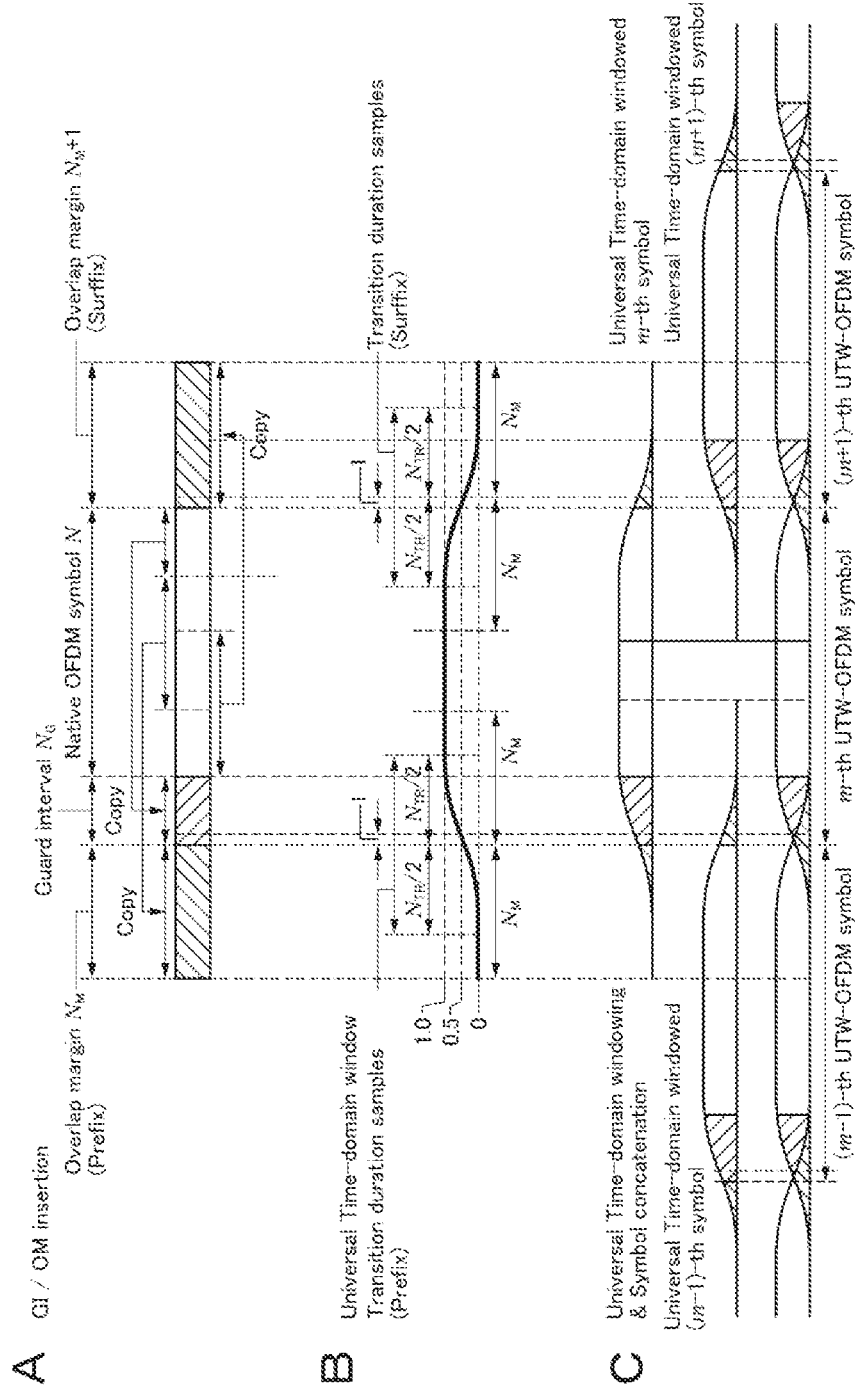
[ Fig. 2 ]

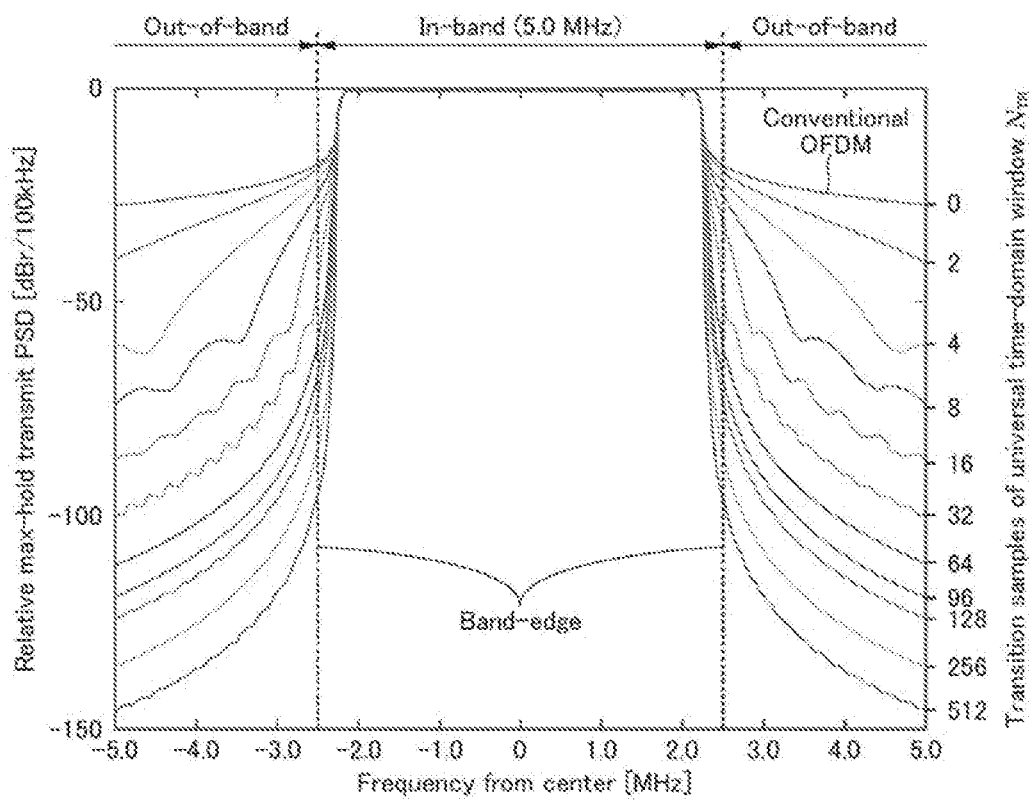
[ Fig. 3 ]

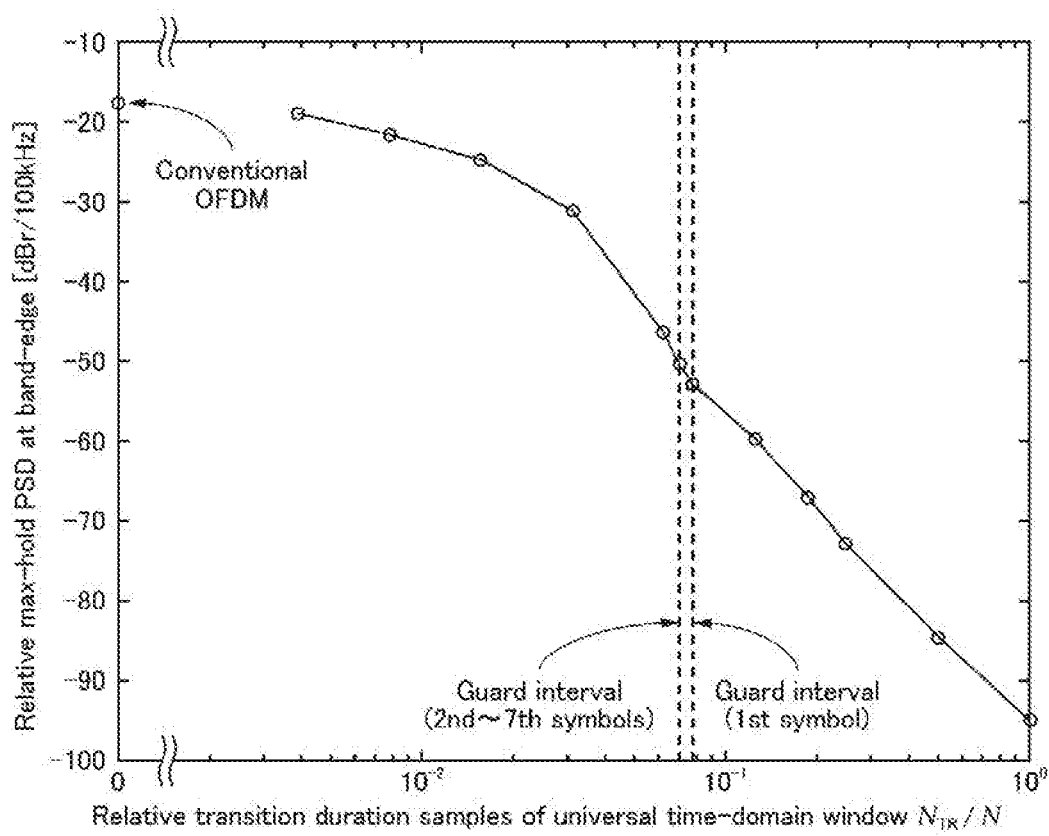
[ Fig. 4 ]

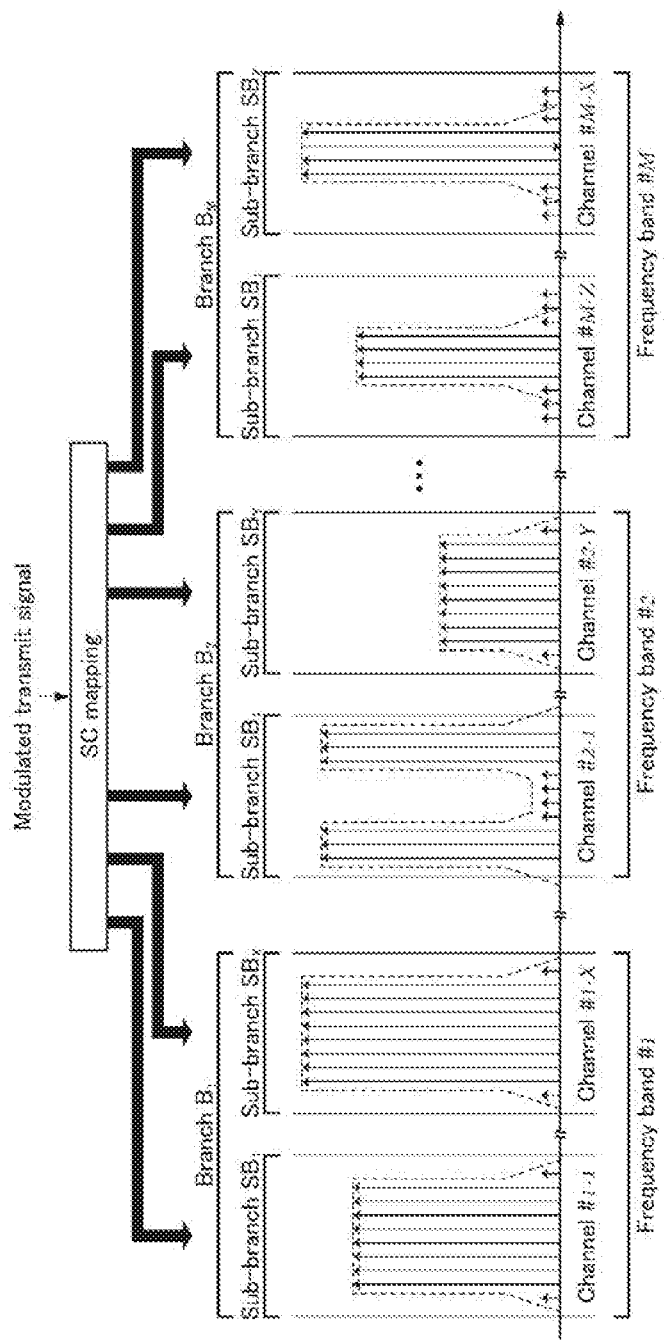
[ Fig. 5 ]

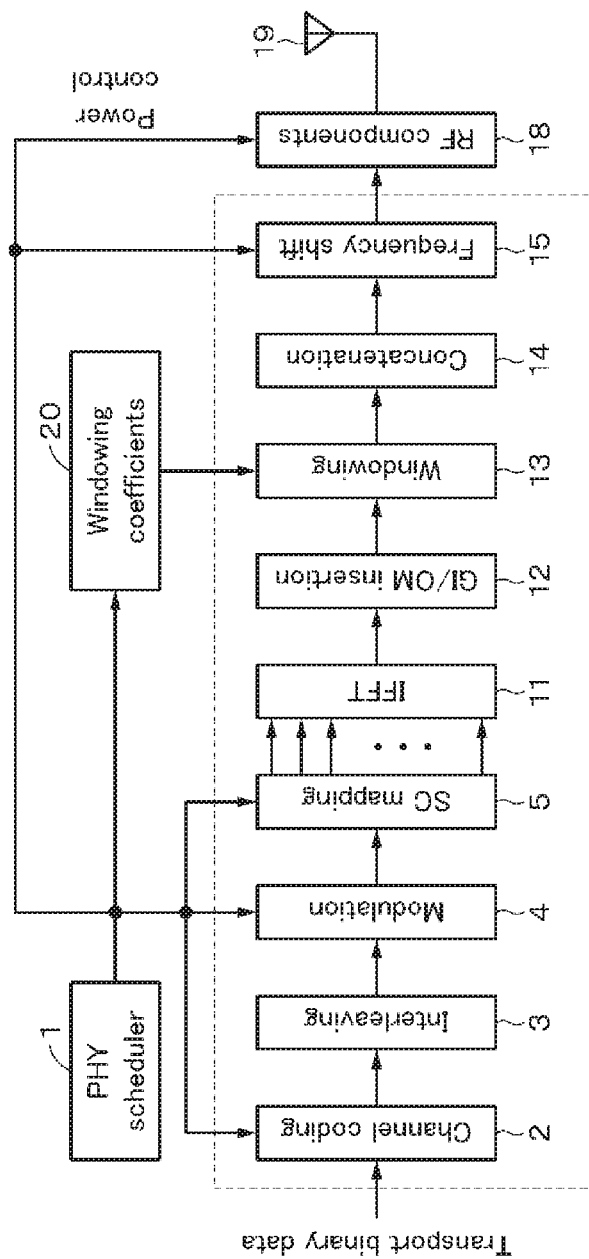
[ Fig. 6 ]

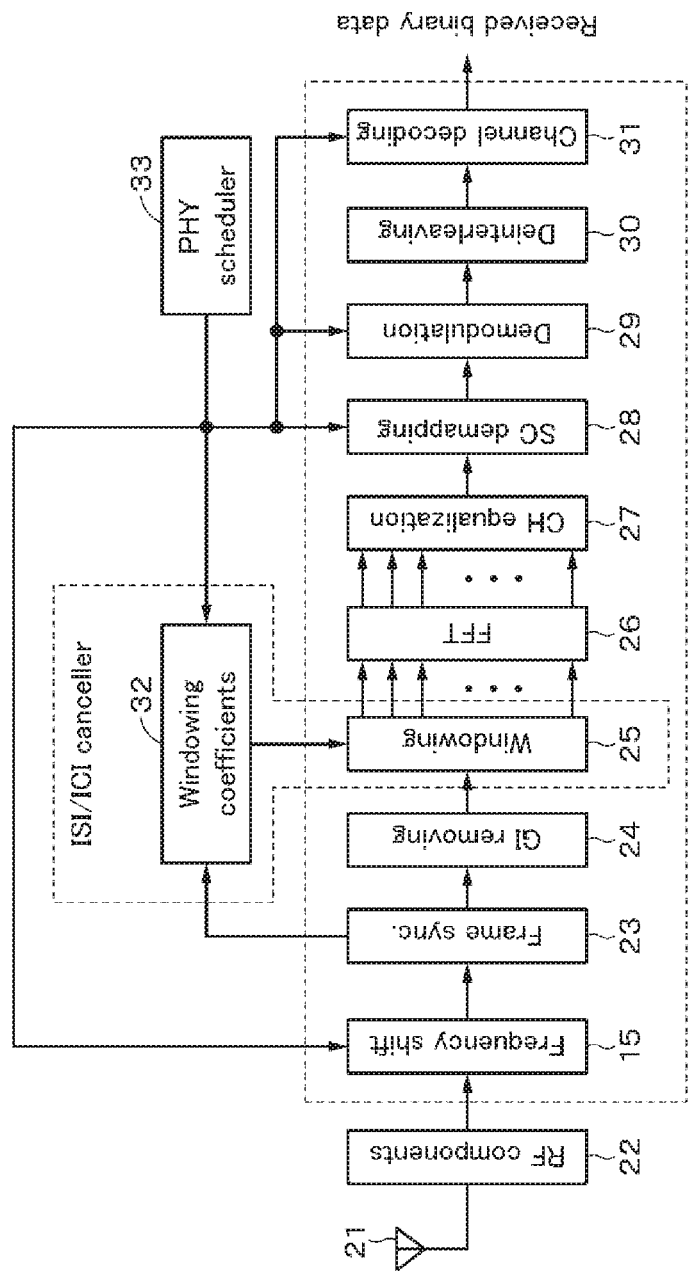
[ Fig. 7 ]

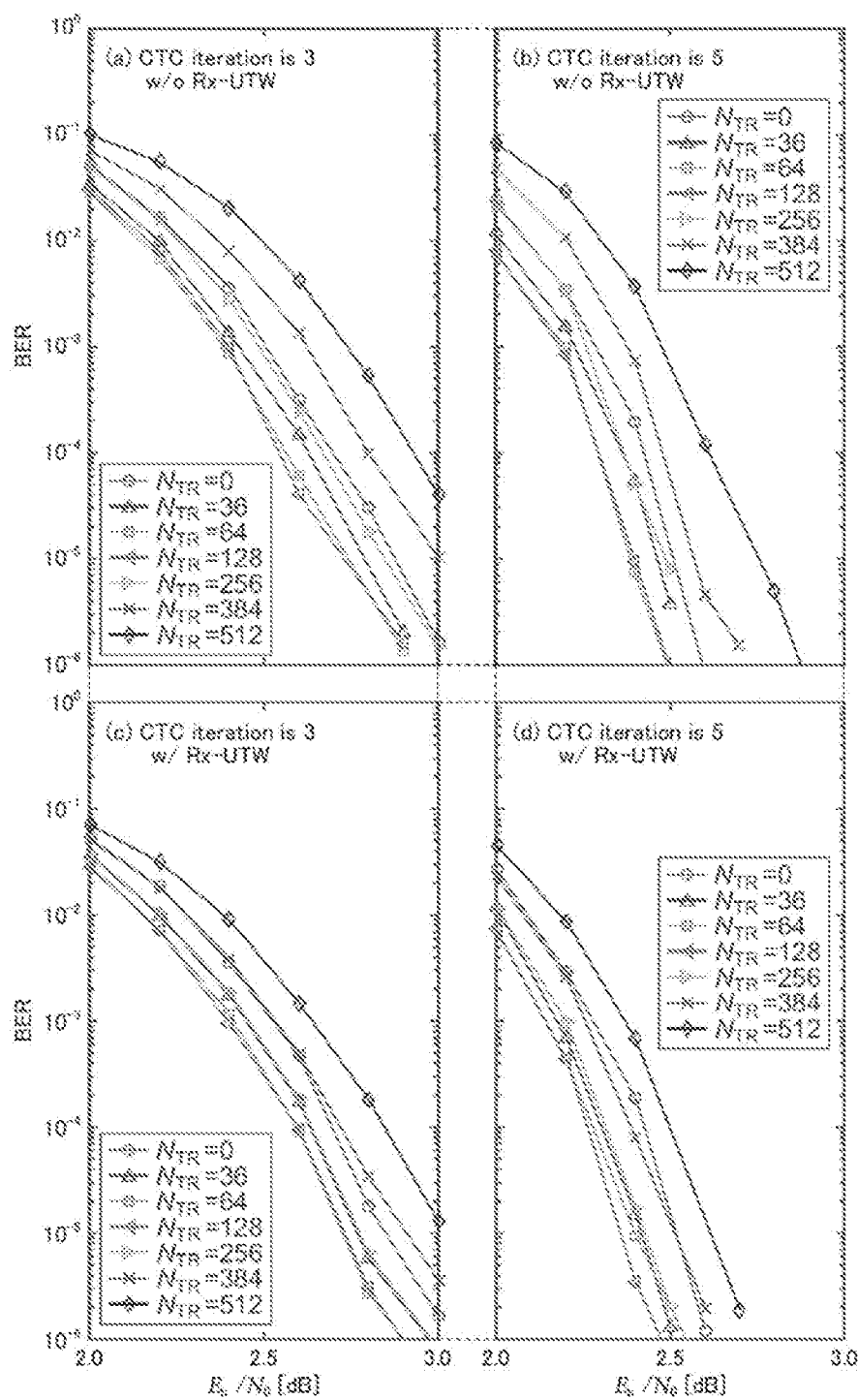
[ Fig. 8 ]

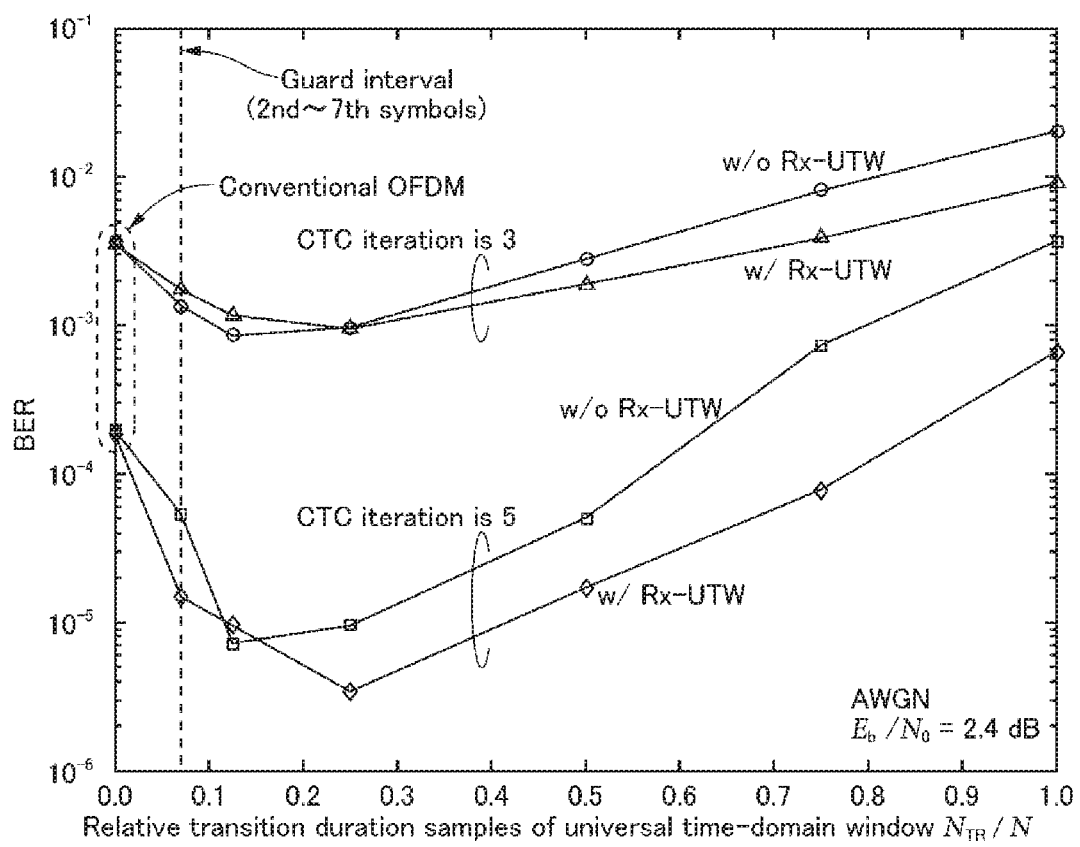
[ Fig. 9 ]

TRANSMITTER, TRANSMISSION METHOD, AND RECEIVER BASED ON TIME-DOMAIN WINDOWS

CROSS REFERENCE TO PRIOR APPLICATION

This application is a National Stage Patent Application of PCT International Patent Application No. PCT/JP2016/005257 (filed on Dec. 28, 2016) under 35 U.S.C. § 371, which claims priority to Japanese Patent Application No. 2016-002695 (filed on Jan. 8, 2016), which are all hereby incorporated by reference in their entirety.

TECHNICAL FIELD

The present invention relates to a transmitter, a transmission method, and a receiver which can perform an efficient channel aggregation.

BACKGROUND ART

An attention is paid to such a channel aggregation that available channels existing in various frequency bands are bound and transmitted in order to increase a communication capacity. In a wireless LAN system such as IEEE802.11ac, a cellular system such as LTE-Advanced, a white space wireless system such as IEEE802.11af, a fifth generation mobile communication system (5G system), or the like, international standard specifications related to the channel aggregation have completely been settled or are being settled and their studies and development are being progressed.

In the foregoing systems, an (OFDM: Orthogonal Frequency Division Multiplexing) or an (OFDMA: Orthogonal Frequency Division Multiple Access) as an OFDM which enables a multiple access by the multiuser is adopted as a modulation system. In such an OFDM(A) system, complex modulation symbols are mapped to a number of subcarriers arranged so as to intersect at right angles with each other, a time-series signal is derived by inverse discrete Fourier transforming such a complex modulation symbol group, and transmission OFDM(A) symbols for wireless transmission are formed. In order to suppress an influence of a propagation delay wave, a guard interval (GI) is inserted into the transmission OFDM(A) symbols. On the reception side, after the OFDM(A) symbols of the number corresponding to a discrete Fourier transformation duration were extracted, by discrete Fourier transforming them and performing proper propagation path estimation and equalization, a complex modulation symbol group of the transmitted subcarriers is derived, and by executing a receiving process such as a demodulation or the like, transport data is reproduced.

Although the OFDM(A) largely contributes to improvement of the transmission capacity of the communication system owing to its high frequency use efficiency, out-of-band radiation electric power (i.e., out-of-band emission) is high and there is a problem about an electric power consumption efficiency. Particularly, in a close-packed terminal environment, a white space secondary use environment, or the like, it is very important to suppress the out-of-band radiation electric power. In order to suppress the out-of-band radiation electric power, a low pass filter (LPF) is effective. As an LPF-based new physical layer signal waveform, a UF-OFDM (Universal-filtered OFDM), an FBMC (Filter bank multicarrier), or the like has been proposed. However, for example, in a wireless LAN or an LTE (Long term evolution) as one of the 4G systems, as a guard bandwidth in a band, a width of up to about 0.25 MHz is left on both sides. In order to install an LPF for sufficiently suppressing the out-of-band radiation electric power within such a narrow guard band, a large calculation amount scale is necessary.

In the wireless LAN, 5G system, or the like, a system called a channel aggregation (or carrier aggregation or channel bonding) in which a plurality of continuous or discontinuous transmission frequency channels are bound and transmitted as one system has been introduced or its introduction is being examined. Since an effective transmission band is widened by binding and transmitting a plurality of channels, the transmission capacity as a system increases.

Fundamentally, most of the communication systems so far use such a form that a frequency channel is used in a band which has unconditionally been allocated. However, in the channel aggregation, such a possibility that channels of separate bands under different circumstances are bound and used like a spectrum mask or the like occurs. Even in the case of performing the aggregation of adjacent or neighboring channels, for example, in white space communication as a communication form in which a license band is secondarily used, there is also a case where a request spectrum mask changes in dependence on whether or not the adjacent channel is occupied by the primary user and there is also a case where the channels under the different spectrum mask conditions are bound and used. When a plurality of channels under the different spectrum mask conditions are used, a necessity of designing a plurality of LPFs which accomplish out-of-band radiation suppressing performance which satisfies the conditions in each channel occurs. According to those LPFs, since a filter length in a time-domain varies in dependence on design conditions, in order to satisfy a time-domain signal length decided by a certain system format, a transmission symbol generating process becomes complicated or difficult.

With respect to an OFDM(A) signal transmitter for transmitting an OFDM(A) signal without using any LPF, the inventors of the present invention has proposed a (Universal time-domain windowed OFDM; UTW-OFDM) system which can be efficiently operated even at the time of applying such a channel aggregation that even in the case of performing OFDM(A) wireless communication in an operation frequency band such as a white space or the like in which transmission spectrum specifications are severe, an out-of-band radiation is sufficiently suppressed and a plurality of channels in the same band or in different bands are bound and transmitted (refer to Patent Literature 1). The method whereby the out-of-band radiation electric power of OFDM(A) is suppressed by a time-domain window is mainly introduced to the wireless LAN. However, since the conventional requested spectrum mask is not severe, in many time-domain windows which have often been installed at present, a possibility that an influence is exerted at the time of using the adjacent channel in the close-packed terminal environment, white space secondary use environment, or the like is high. In the UTW-OFDM system, by increasing a very short window length in the time-domain window which has often been used in the related art to the same length as a symbol length at most, a very large out-of-band radiation electric power suppressing effect can be obtained. In the invention, since the out-of-band radiation suppressing process is executed by the time-domain window, fundamentally, it can be realized by a multiplying process and becomes a convolution process in the LPF based method as a frequency-domain process, and a problem of an increase in calculation amount can be solved. Even in the case where the channels under the different spectrum mask conditions are bound and transmitted, such a design that a (Universal Time-domain Window; UTW) of a different kind can be individually and easily applied to the time-domain signal allocated to each channel is used. Therefore, an efficient channel aggregation which can cope with the different channel operating conditions while satisfying a signal time length format which is required for the system can be performed.

CITATION LIST

Patent Literature

[PTL 1] JP 2015-207834 A

SUMMARY OF INVENTION

Technical Problem

Although it is necessary to extremely suppress an out-of-band radiation in order to realize the operation in a channel to which a severe spectrum mask is imposed or the operation in a channel in which it is necessary to extremely improve a frequency use efficiency, in the case of realizing it by a process using a frequency filter, a calculation amount increases. In the case of a channel aggregation in which a plurality of channels are bound and transmitted as one system, if the conditions such as spectrum mask, transport electric power, bandwidth, and the like which are required in each of the channels to be bound are different, according to the frequency filter based system, it is difficult to efficiently generate a transmission signal.

It is, therefore, an object of the invention to provide a transmitter, a transmission method, and a receiver in which an out-of-band radiation suppression can be realized by a small calculation amount and an efficient channel aggregation can be realized by using a time-domain window which can efficiently suppress out-of-band radiation electric power in each channel even when applying the channel aggregation.

Solution to Problem

According to the invention, there is provided a transmitter using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system, wherein:

one or a plurality of transmission units are provided in parallel at a post stage of a subcarrier mapping circuit in correspondence to one or a plurality of frequency bands;

one or a plurality of transmission processing units are provided in parallel for each of the transmission units in correspondence to one or a plurality of channels;

the transmission processing unit has an inverse fast Fourier transforming circuit or a discrete inverse Fourier transforming circuit, a GI and overlap margin (OM) insertion circuit, and a time-domain windowing processing unit;

the time-domain windowing processing unit multiplies a universal time-domain window function in accordance with a spectrum mask and transport electric power which are required in each channel, thereby suppressing out-of-band radiation electric power every channel; and a kind and a window transition duration of the time-domain window function can be arbitrarily set every channel.

According to the invention, there is provided a transmission method using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system, wherein:

one or a plurality of transmission units are provided in parallel at a post stage of a subcarrier mapping circuit in correspondence to one or a plurality of frequency bands;

one or a plurality of transmission processing units are provided in parallel for each of the transmission units in correspondence to one or a plurality of channels;

an inverse fast Fourier transforming process or a discrete inverse Fourier transforming process, a GI and OM inserting process, and a time-domain windowing process are sequentially executed by the transmission processing unit;

the time-domain windowing process is executed by multiplying a universal time-domain window function in accordance with a spectrum mask and transport electric power which are required is each channel, thereby suppressing out-of-band radiation electric power every channel; and a kind and a window transition duration of the time-domain window function can be arbitrarily set every channel.

According to the invention, there is provided a receiver using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system, wherein:

one or a plurality of reception units are provided in parallel in correspondence to one or a plurality of frequency bands;

one or a plurality of reception processing units are provided in parallel for each of the reception units in correspondence to one or a plurality of channels;

the reception processing unit has a GI removing unit, a time-domain windowing processing unit, and a fast Fourier transforming circuit;

the time-domain windowing processing unit multiplies a universal time-domain window function in accordance with a spectrum mask and transport electric power which are required in each channel, thereby suppressing out-of-band radiation electric power every channel; and a kind and a window transition duration of the time-domain window function can be set to the same kind and duration as those on a transmission side.

Advantageous Effects of Invention

In the channel aggregation in which a plurality of channels are bound and transmitted, in the case where the transmission is performed in the channels whose frequencies are away from each other or in the case where the conditions such as a spectrum mask, transport electric power, bandwidth, and the like which are required in the channels to be bound are different, it is difficult to efficiently generate the transmission signal. According to at least one embodiment, the invention can generate in a lump the transmission signals which satisfy the transmitting conditions in each channel. The effects disclosed here are not always limited but may be any one of the effects disclosed in the invention. The contents of the invention are not limitedly interpreted by the effects shown as examples in the following description.

BRIEF DESCRIPTION OF DRAWINGS

[FIG. 1] Block diagram showing a construction of an embodiment of the invention.

[FIG. 2] Schematic diagram for describing a time-domain windowing process.

[FIG. 3] Graph showing an electric power spectrum density of an LTE signal to which the invention is applied.

[FIG. 4] Graph for describing suppressing performance of out-of-band radiation electric power.

[FIG. 5] Frequency spectrum showing the operation of the embodiment of the invention.

[FIG. 6] Block diagram showing a construction of a transmitter in the case of a single channel.

[FIG. 7] Block diagram showing a construction of a receiver in the case of the single channel.

[FIG. 8] Graph for an evaluation of a bit error rate of the LTE signal.

[FIG. 9] Graph for use in explanation of an effect of a universal time-domain window in the receiver.

DESCRIPTION OF EMBODIMENTS

Embodiments of the invention will be described hereinbelow. The embodiments which will be described hereinbelow are exemplary specific examples of the invention and various kinds of limitations which are technically preferred are added. However, it is assumed that the scope of the invention is not limited to those embodiments unless otherwise described to limit the invention in the following explanation.

One embodiment is an OFDM signal transmitter for transmitting a signal of an OFDM system. That is, it is a transmitter for transmitting, every block, time-domain symbols like an OFDM or OFDMA which enables a transmission signal to be transmitted by an arbitrary frequency band, an arbitrary channel width, an arbitrary spectrum mask, and arbitrary electric power. FIG. 1 shows a construction of the embodiment of the invention.

Transport binary data is supplied to a channel coding unit 2 and is channel encoded. An output of the channel coding unit 2 is supplied to an interleaving circuit 3 and is interleaved. An output of the interleaving circuit 3 supplied to a modulation unit 4 and is modulated to a complex signal. A channel coding system, its coding ratio, a proper interleaving system, and a proper primary modulation system are selected in accordance with resource control information (coding parameter, interleaving parameter, modulating parameter) of a physical layer scheduler 1.

An output of the modulation unit 4 is supplied to a subcarrier mapping circuit 5 and is mapped to an input of an (Inverse fast Fourier transform; IFFT) of the relevant sub-branch which belongs to the relevant branch so as to be located at a desired subcarrier position of a desired channel in a desired frequency band. An aggregation control signal is supplied to the subcarrier mapping circuit 5 from the physical layer scheduler 1.

In the construction of FIG. 1, transmission units $B_1$ to $B_M$ are provided in parallel in correspondence to M branches. Transmission processing units $SB_1$ to $SB_X$ are provided in parallel for the transmission unit $B_1$ in correspondence to sub-branches. Transmission processing units $SB_1$ to $SB_Y$ are provided in parallel for the transmission unit $B_2$ in correspondence to Y sub-branches. Transmission processing units $SB_1$ to $SB_2$ are provided in parallel for the transmission unit $B_M$ in correspondence to Z sub-branches.

The transmission units mutually have a similar construction. The transmission processing units mutually have a similar construction. For example, constructions of a branch $B_1$ and a sub-branch $SB_1$ will be described. The transmission processing unit inverse Fourier transforms in a lump on an OFDM symbol unit basis by an IFFT circuit 11 and generates an OFDM signal (called, a Native OFDM symbol) of a baseband of a time region. Assuming that a sampling frequency is equal to $F_S$ and a native OFDM symbol length is equal to $T_F$, one period of the Native OFDM symbol is expressed by $N=T_F F_S$ sample points.

In a GI/OM insertion circuit 12, a GI for absorbing an influence of a propagation delay and an (Overlap margin; OM) with the adjacent OFDM symbol are inserted to an output of the IFFT circuit 11. As shown in FIG. 2A, the GI and OM are formed by copying portions before and after the Native OFDM symbol, respectively. This is nothing but such an operation that by using a periodicity of the Native OFDM symbol, its symbol length is extended without breaking a continuity.

After GI and OM were inserted in the GI/OM insertion circuit 12, a time-domain windowing process is executed in a time-domain windowing processing unit 13. An arbitrary time-domain window function (Universal Time-domain Window; UTW) is multiplied in accordance with a spectrum mask and transport electric power which are required in each channel, thereby suppressing out-of-band radiation electric power ever sub-branch. As for the time-domain window function in this instance, its kind and window transition duration can be arbitrarily set every channel and an arbitrary standardization coefficient can be multiplied so that the transport electric power in the baseband can be controlled. The kind, window transition duration, and standardization coefficient of the time-domain window are controlled by, for example, a controller such as a physical layer scheduler 1. Further, a coefficient of the time-domain windowing process is specified by a lookup table 20 for the time-domain windowing process.

FIG. 2B shows an example of the time-domain window function. A result of a process (time-domain windowing process) for multiplying the Native OFDM symbol (FIG. 2A) by the time-domain window function (FIG. 2B) is shown in FIG. 2C. A window transition duration ($N_{TR}$) corresponds to a time in which the windowing is actually performed on the basis of the foregoing time-domain window function. The longer the window transition duration ($N_{TR}$) is, a time zone in which the windowing is performed by the time-domain window function becomes long. Consequently, an inclination of a shape of the time-domain window function becomes gentle. On the other hand, the shorter the window transition duration ($N_{TR}$) is, the time zone in which the windowing performed by the time-domain window function becomes short. Consequently, the inclination of the shape of the time-domain window function becomes steep.

Out-of-band radiation electric power suppressing performance is evaluated by a computer simulation by using an LTE signal shown in the following table 1. A Max-hold value of a relative power spectrum density; Relative PSD) of the LTE signal in the case of a system of one branch and one sub-branch is shown in FIG. 3. A (Resolution bandwidth; RBW) is set to 100 kHz and an evaluation is performed by 4-times oversampling. In this evaluation, a raised cosine windows function is used as a universal time-domain window.

TABLE 1

| Signal format | LTE Downlink (R. 8.0) |
|---|---|
| Air interface | OFDM |
| Channel bandwidth | 5.0 MHz |
| Sampling frequency | 7.58 MHz |
| FFT size N | 512 |
| GI rate (1st symbol) | 160/2048 |
| GI rate (otherwise) | 144/2048 |
| No. subcarriers/symbol | 300 |
| No. resource blocks/slot | 25 |
| No. slots/subframe | 2 |
| Occupied band | 4.3 MHz |
| Guard band | 0.25 MHz on both edges |

As shown in FIG. 3, it will be understood that the longer the window transition duration ($N_{TR}$) is, the out-of-band radiation to the spectrum mask becomes small. When the time-domain windowing process is never executed ($N_{TR}=0$), a frequency component exceeding the spectrum mask in an out-of-band region is very large. When the time-domain windowing process is executed to a certain extent, the out-of-band radiation electric power of the OFDM signal is suppressed. When the window transition duration is further increased, the out-of-band radiation electric power of the OFDM signal is further suppressed. From FIG. 3, it will be understood that the high out-of-band radiation electric power exists in the LTE signal according to the conventional OFDM system. The longer the window transition duration $N_{TR}$ is, the out-of-band radiation electric power is suppressed.

A Max-hold value of the Relative PSD in a channel band edge (Band-edge) at the time when the window transition duration $N_{TR}$ is changed is shown in FIG. 4. Although the Relative PSD in the Band-edge of the conventional OFDM is equal to −17.8 (dBr/100 kHz), when the window transition duration is equal to $N_{TR}/N=36/512≈0.07$ corresponding to the GI length in the second to seventh symbols, the Relative PSD is equal to −50.4 (dBr/100 kHz), and an improvement of 32.6 dB can be confirmed. When the window transition duration is further increased and is set to $N_{TR}/N=128/512=0.25$, $N_{TR}/N=256/512=0.5$, and $N_{TR}/N=512/512=1.0$, respectively, as a Relative PSD in the Band-edge, −72.9, −84.5, and −94.9 (dBr/100 kHz) are accomplished, respectively. It is shown that the suppressing performance of 55.1, 66.7, and 77.1 (dB) can be improved as compared with the conventional OFDM.

When explaining by returning to FIG. 1, an output of the time-domain windowing processing unit 13 is supplied to a symbol concatenation unit 14 and the symbols are mutually concatenated. A state where the adjacent other (m−1)-th and (m+1)-th symbols are combined is shown in FIG. 2C.

After transmission symbols formed in sub-branches $SB_1$ to $SB_X$ of the branch $B_1$ were arbitrarily frequency-shifted by a frequency shift circuit 15 in accordance with each channel operation frequency, they are synthesized by a summing circuit 16. An output of the summing circuit 16 is converted into an analog signal by a D/A converter 17, is supplied to a common RF circuit 18, and is transmitted through an antenna 19. Transport electric power of the RF circuit 18 is controlled by a control signal from the physical layer scheduler 1. Order of the symbol concatenation unit 14 and the summing circuit 16 may be reversed. It is also possible to use such a construction that the symbols after the UTW was applied are synthesized in the sub-branch by the summing circuit 16 and the symbols are subsequently concatenated with each other by one symbol concatenation unit 14. Although an example of a wireless transmitter is shown in FIG. 1, by using various kinds of signal converters in place of the antenna, for example, it is also possible to apply to wired communication such as optical fiber communication or the like.

A process similar to the process in the foregoing branch $B_1$ is executed in each of the other transmission units $B_1$ to $B_M$. FIG. 5 is a diagram showing an example of the operation. The branch $B_1$ corresponds to a frequency band #1 and the branch $B_M$ corresponds to a frequency band #M. In each frequency band, for example, in the frequency band #1, the sub-branch $SB_1$ corresponds to a channel #1-1 and the sub-branch $SB_X$ corresponds to a channel #1-X. For example, in a channel #2-Y, since the transport electric power is small, it is sufficient that the out-of-band radiation electric power suppressing performance necessary to satisfy the spectrum mask is small. Therefore, as for the length and kind of the time-domain window, a length and a kind which do not have high suppressing performance are selected. On the contrary, when the requested spectrum mask is severe, the time-domain window and window transition duration of higher suppressing performance are selected. Naturally, it is also possible to construct in such a manner that the mapping is not partially performed to input terminals of IFFT. In such a case, a spectrum hole can be formed like a channel #2-1. The number of sub-branches in each branch is set to an arbitrary value and may be naturally equal to 1. Further, the number of branches is set to an arbitrary value and may be naturally equal to 1. The system of one branch and one sub-branch is an expression of a single channel in which the channel aggregation is not performed.

FIG. 6 shows a construction of a transmitter in the case of the single channel. Portions corresponding to those in FIG. 1 are designated by the same reference numerals.

A construction of a receiver in the case of the single channel is shown in FIG. 7. According to the receiver in the case of the channel aggregation, the constructions each shown in FIG. 7 are arranged in parallel in correspondence to the sub-branches and a construction of one branch is formed. Further, constructions of the branch are provided in parallel correspondence to the number of branches.

The case of the single channel will be described hereinbelow. First, the OFDM system will be described. A frequency use efficiency of the OFDM system is high and the OFDM system is a communication system which is widely used in the LTE, wireless LAN, ground digital television broadcasting ISDB-T, or the like. Assuming that $X_{(m, n)}$ is an n-th subcarrier signal of the m-th symbol, an OFDM transmission symbol shown by Math. 1 can be generated as shown by the following Math. 2.

[Math. 1]

$$s_m^{CP} \in \mathcal{C}^{N+N_G}$$

[Math. 2]

$$s_m^{CP} = F_G^{-1} x_m. \qquad (1)$$

$$x_m = [x_{(m,0)}, x_{(m,1)}, \ldots, x_{(m,N-1)}]^T. \qquad (2)$$

$$(F_G^{-1})_{(g,q)} = \exp[j2\pi q(g-N_G)/N]. \qquad (3)$$

Where, N denotes the number of subcarriers and $N_G$ indicates the number of time samples corresponding to a (Guard interval; GI). Math. 3 is an inverse discrete Fourier transformation (IDFT) matrix which considers the GI insertion, and $0 \leq g < N+N_G$ and $0 \leq q < N$. Although a nature of a continuous periodic function is provided in one OFDM symbol as mentioned above, discontinuous points occur between the adjacent symbols and become a factor of causing high out-of-band radiation electric power.

[Math. 3]

$$F_G^{-1} \in \mathcal{C}^{N+N_G \times N}$$

Subsequently, the UTW-OFDM system will be described. According to this system, in order to efficiently suppress the high out-of-band radiation electric power of the OFDM system, the time-domain windowing process is introduced to both of the transmitter and receiver. A main factor of the occurrence of the out-of-band radiation electric power which becomes a problem in the OFDM system is the discontinuous points existing between the symbols. In the UTW-OFDM system, the out-of-band radiation electric power is suppressed by making the discontinuous points between the symbols continuous by the time-domain window. Although such a process by the time-domain window function is a generally known method as well as IEEE802.11 or the like, it is sufficient when accomplishing such a relatively gentle spectrum mask that is required in the conventional wireless system even in the case of an extremely short window function length. Therefore, such a system that the out-of-band radiation electric power is suppressed to an extremely low level by universally extending the window function length hardly exists. In the UTW-OFDM system, an architecture in which the kind and window transition duration of the window function can be universally adaptively varied is proposed and the out-of-band radiation electric power suppressing performance which is obtained by largely designing the window transition duration is evaluated, and a receiver construction in which a deterioration in reception quality by ISI (Inter Symbol Interference) and ICI (Inter Carrier interference) which occur as tradeoff is improved is proposed.

In the transmitter shown in FIG. 6, proper primary modulation system and channel coding system are selected in accordance with resource control information of the physical layer scheduler 1, and the transport binary data is mapped to a proper subcarrier. The mapped subcarrier signal is converted into a time-domain OFDM signal (Native OFDM symbol) by the inverse fast Fourier transform (IFFT). Now, assuming that a sampling frequency is equal to $F_S$ and a Native OFDM symbol length is equal to $T_F$, one period of the Native OFDM symbol is expressed by $N=T_F F_S$ sample points.

After that, the GI and an overlap margin (OM) with the adjacent OFDM symbol for absorbing an influence of the propagation delay are inserted. The GI and OM are generated by copying the portions before and after the Native OFDM symbol as shown in FIG. 2A, respectively. This is nothing but such an operation that by using a periodicity of the Native OFDM symbol, its symbol length is extended without breaking the continuity. The m-th OFDM symbol (Math. 4) in which the GI of $N_G$ samples was inserted, the OM of every $N_M$ samples was inserted before the symbol, and the OM of every $N_{M+1}$ samples was inserted after the symbol can be expressed by Math. 5.

[Math. 4]

$$s_m \in \mathcal{C}^{N_{GM}}$$

[Math. 5]

$$s_m = F_{GM}^{-1} x_m \quad (4)$$

[Math. 6]

$$F_{GM}^{-1} \in \mathcal{C}^{N_{GM} \times N}$$

Where, $N_{GM}=N+N_G+2N_M+1$. A term of Math. 6 is an IFFT matrix which considers the insertion of the GI and OM and is defined like Math. 7.

[Math. 7]

$$(F_{GM}^{-1})_{(p,q)} = \exp[j2\pi q(p-N_G-N_M)/N]. \quad (5)$$

Where, $0 \leq p < N_{GM}$. By multiplying the OFDM signal is which the GI and OM were inserted by the universal time-domain window as shown in FIG. 2B as shown by Math. 9, the m-th UTW-OFDM symbol (Math. 8) is generated.

[Math. 8]

$$s_m^{UTW} \in \mathcal{C}^{N_{GM}}$$

[Math. 9]

$$s_m^{UTW} = W^{UTW} F_{GM}^{-1} x_m. \quad (6)$$

Where, Math. 10 is a universal time-domain window matrix, diag( ) denotes a diagonal matrix operator, and Math. 11 is a universal time-domain window vector and is designed as follows.

[Math. 10]

$$W^{UTW} = \text{diag}(w^{UTW}) \in \mathcal{C}^{N_{GM} \times N_{GM}}$$

[Math. 11]

$$w^{UTW} \in \mathcal{C}^{N_{GM}}$$

[Math. 12]

$$w^{UTW} = \begin{bmatrix} 0^{(N_M - N_{TR}/2) \times 1} \\ w_{TR} \\ 1^{(N+N_G - N_{TR}+1) \times 1} \\ w_{TR}^I \\ 0^{(N_M - N_{TR}/2) \times 1} \end{bmatrix}. \quad (7)$$

Where, $0^{P \times Q}$ is a zero matrix of P rows and Q columns, and $1^{P \times Q}$ is a matrix in which all elements are equal to 1. Math. 13 and Math. 14 indicate a universal time-domain window transition vector, an inverse transition vector, and a window transition duration, respectively, and are defined as shown in Math. 15. However, in the case of using a window function other than a raised cosine window function shown in Math. 16, it is not always necessary to satisfy the conditions (10) and (11) of Math. 15.

[Math. 13]

$$w_{TR} \in \mathcal{C}^{N_{TR}}$$

[Math. 14]

$$w_{TR}^I \in \mathcal{C}^{N_{TR}}, N_{TR}$$

[Math. 15]

$$w_{TR} = [w_0, w_1, \ldots, w_{N_{TR}-2}, w_{N_{TR}-1}]^T, \quad (8)$$

$$w_{TR}^I = [w_{N_{TR}-1}, w_{N_{TR}-2}, \ldots, w_1, w_0]^T, \quad (9)$$

$$[w_{TR}, 1] + [1, w_{TR}^I] = 1^{(N_{TR}+1) \times 1}, \quad (10)$$

$$w_{N_{TR}/2} = \frac{1}{2}. \quad (11)$$

The foregoing universal time-domain window transition vector can be realized by various functions and is expressed by the following Math. 16 in the case of applying, for example, a raised cosine window function.

[Math. 16]

$$w_n = \sin^2\left(\frac{n\pi}{2N_{TR}}\right). \quad (12)$$

Finally, as shown in FIG. 2C, the symbols are concatenated so that the adjacent OM intervals before and after the UTW-OFDM symbol overlap, and a UTW-OFDM transmission signal is generated. As for the generated UTW-OFDM transmission signal, a center frequency of the signal may be converted by the frequency shift circuit on a baseband unit basis.

A construction of a receiver of the UTW-OFDM system is shown in FIG. 7. In the case of the construction corresponding to the construction of the channel aggregation shown in FIG. 1, one or a plurality of reception units are provided in parallel in correspondence to one or a plurality of frequency bands and one or a plurality of reception processing units are provided in parallel for each of the reception units is correspondence to one or a plurality of channels. The reception processing unit has a GI removing unit, an ISI/ICI suppression processing unit, and a fast Fourier transforming circuit. An installation example in the case where a time-domain windowing is used for an ISI/ICI suppressing process is shown in FIG. 7. A time-domain windowing processing unit multiplies a universal time-domain window function in accordance with a spectrum mask and transport electric power which are required in each channel, thereby suppressing out-of-band radiation electric power every channel. A kind and a window transition duration of the time-domain window function can be set to the same kind and duration as those on the transmission side. Naturally, another ISI/ICI suppression processing method may be applied.

FIG. 7 is a construction of a single channel. A signal received by an antenna 21 is supplied to the frequency shift circuit 15 through an RF circuit 22. The frequency shifted reception signal is supplied to a frame synchronization extraction unit 23 and a timing signal for a process on the reception side is formed. At this time, naturally, a frequency shift amount may be equal to 0. The timing signal is supplied to a windowing coefficients generation unit 32. After the guard interval was removed by a GI removing unit 24, the signal is supplied to a time-domain windowing processing unit 25.

An output of the time-domain windowing processing unit 25 is supplied to a fast Fourier transforming (FFT) circuit 26 and is fast Fourier transformed. An output of the FFT circuit 26 is supplied to a subcarrier demapping circuit 28 through a channel equalization circuit 27. An output of the subcarrier demapping circuit 28 is supplied to a demodulation circuit 29. An output of the demodulation circuit 29 is supplied to a deinterleaving circuit 30. An output of the deinterleaving circuit 30 is supplied to a channel decoding unit 31 and reception binary data is extracted in an output of the channel decoding unit 31. Those processes are controlled in accordance with resource control information (decoding parameter, deinterleaving parameter, demodulating parameter) of a physical layer scheduler 33.

Further, the process on the reception side in the case where the time-domain windowing is used for the ISI/ICI suppressing process will be described. Assuming that a propagation channel matrix is expressed by Math. 17 and $n_{m,n}$ indicates Gaussian noises in which an average in the n-th sample of the m-th symbol is equal to 0 and a variance is equal to $\sigma^2$, a UTW-OFDM reception signal (Math. 18) of the m-th symbol portion can be expressed by Math. 19.

[Math. 17]

$$H_m \in \mathcal{C}^{N_{GM} \times N_{GM}}$$

[Math. 18]

$$r_m \in \mathcal{C}^{N_{GM}}$$

[Math. 19]

$$r_m = H_m(s_m^{UTW} + s_m^{(-)} + s_m^{(+)}) + n_m, \quad (13)$$

$$n_m = [n_{m,-(N_M+N_G)}, \ldots, n_{m,0}, \ldots, n_{m,N+N_M}]^T, \quad (14)$$

For simplicity, now assuming that a propagation channel between the transmitter and the receiver has frequency flat characteristics, the propagation channel matrix can be defined by Math. 20.

[Math. 20]

$$H_m = \text{diag}(h_m). \quad (15)$$

$$h_m = [h_{m,-(N_M+N_G)}, \ldots, h_{m,0}, \ldots, h_{m,N+N_M}]^T \quad (16)$$

Math. 21 and Math. 22 denote ISI components which leak from the (m−1)-th symbol and the (m+1)-th symbol into the m-th symbol and can be expressed by Math. 23.

[Math. 21]

$$s_m^{(-)} \in \mathcal{C}^{N_{GM}}$$

[Math. 22]

$$s_m^{(+)} \in \mathcal{C}^{N_{GM}}$$

[Math. 23]

$$s_m^{(-)} = W_{(-)}^{UTW}[(F_{(-)}^{-1})^T, 0^{N \times (N+N_G)}]^T x_{m-1}, \quad (17)$$

$$s_m^{(+)} = W_{(+)}^{UTW}[0^{N \times (N+N_G)}, (F_{(+)}^{-1})^T]^T x_{m-1}, \quad (18)$$

$F^{-1}_{(-)}$ and $F^{-1}_{(+)}$ denote inverse Fourier transformation matrices for expressing the ISI components which leak from the symbols before and after the relevant symbol and can be expressed by Math. 24, respectively. Where, $N+N_G < P_{(-)} < N_{GM}$ and $0 \leq p_{(+)} < 2N_M+1$.

[Math. 24]

$$(F_{(-)}^{-1})_{(p_{(-)}, q)} = \exp[j2\pi q(p_{(-)} - N_G - N_M)/N]. \quad (19)$$

$$(F_{(+)}^{-1})_{(p_{(+)}, q)} = \exp[j2\pi q(p_{(+)} - N_G - N_M)/N]. \quad (20)$$

Math. 25 and Math. 26 denote universal time-domain window function matrices of the portions which leaked from the symbols before and after the relevant symbol and can be expressed by Math. 27.

[Math. 25]

$$W_{(-)}^{UTW} = \text{diag}(w_{(-)}^{UTW}) \in \mathcal{C}^{N_{GM} \times N_{GM}}$$

[Math. 26]

$$W_{(+)}^{UTW} = \text{diag}(w_{(+)}^{UTW}) \in \mathcal{C}^{N_{GM} \times N_{GM}}$$

[Math. 27]

$$w_{(-)}^{UTW} = \begin{bmatrix} 1^{(N_M - N_{TR}/2) \times 1} \\ w_{TR}^l \\ 0^{(N+N_G+N_M-N_{TR}/2+1) \times 1} \end{bmatrix}. \quad (21)$$

-continued $$w_{(+)}^{UTW} = \begin{bmatrix} 0^{(N+N_G+N_M-N_{TR}/2+1)\times 1} \\ w_{TR} \\ 1^{(N_M-N_{TR}/2)\times 1} \end{bmatrix}. \quad (22)$$

After a frame synchronization was performed to a UTW-OFDM reception signal $r_m$ of the m-th symbol portion, the resultant signal is multiplied by the same universal time-domain window as that on the transmission side which was adjusted in accordance with its synchronization point and, subsequently, the Fourier transformation is performed, thereby extracting the subcarrier component. A subcarrier signal vector (Math. 28) of the extracted m-th symbol can be expressed by Math. 29.

[Math. 28]

$$\mathbf{y}_m \in \mathcal{C}^N$$

[Math. 29]

$$\mathbf{y}_m = \text{FDW}^{UTW} r_m. \quad (23)$$

Where, Math. 30 denotes a frame synchronization (guard interval removal) matrix, a reception side universal time-domain window matrix, and a Fourier transformation matrix and is defined as shown by Math. 31.

[Math. 30]

$$D \in \mathcal{C}^{N_{GM}\times N}, F \in \mathcal{C}^{N\times N}$$

[Math. 31]

$$D = [0^{(N_{GM}\times N_S)}, I^{(N)}, 0^{(N_{GM}\times (N_{GM}-N_S-N))}], \quad (24)$$

$$(F)_{(r\cdot q)} = \exp[-j2\pi qr/N], \quad 0 \le r < N, \quad (25)$$

Where, Math. 31 denotes a unit matrix and $N_S$ indicates a frame synchronization point. The universal time-domain window on the reception side is an example of installation of the ISI/ICI suppressing process for suppressing the ISI components from the adjacent channels and the ICI component which is caused since an orthogonality of a Fourier transformation pair is broken by the ISI components. Another interference suppressing method may be applied. After that, a channel estimation and an equalization are performed every subcarrier to the subcarrier divided reception signal and a demapping is performed. Subsequently, an I/O demodulation is performed and, finally, a channel decoding is performed and a demodulating process is completed.

Bit-error-rate (BER) characteristics of the foregoing UTW-OFDM system are evaluated by a computer simulation. It is assumed that the transmission signal is an LTE Downlink signal of a 5 MHz bandwidth mode to which the UTW-OFDM shown in Table 1 is applied. Computer simulation specifications are shown in Table 2. QPSK is used as a modulation system, a convolutional turbo coding is used as a channel coding, and a Max-Log algorithm is used for decoding.

TABLE 2

| System | LTE Downlink (see Table 1) |
|---|---|
| Modulation | QPSK |
| Channel coding | Convolutional turbo coding |
| Turbo decoding scheme | Max-Log MAP |
| Turbo decoding iteration | 3 and 5 |
| Transport block size | 2624 bits |
| Available REs for PDSCH | 6900 bits |
| UTW type | Raised-cosine window |
| Channel | AWGN |

BER characteristics in the case where the universal time-domain window on the reception side when the number of turbo decoding iteration times is equal to 3 and 5 is not used are shown in (a) and (b) in FIG. 8, respectively. BER characteristics in the case where the universal time-domain window on the reception side when the number of turbo decoding iteration times is equal to 3 and 5 is used are shown in (c) and (d) in FIG. 8, respectively. Results in which effects of the time-domain window transition duration and the reception side universal time-domain window were compared and evaluated by the BER in $E_b/N_0=2.4$ dB are shown in FIG. 9. $N_{TR}=0$ denotes a state where the transition duration of the universal time-domain window is equal to 0, that is, a result of the conventional OFDM in which the time-domain window is not applied. When $N_{TR}$ is increased at a certain $E_b/N_0$, the BER is gradually improved in all cases. This is because by increasing $N_{TR}$, the out-of-band radiation electric power is suppressed and the transport electric power of the data portion in the band occupied in the whole transport electric power increases. However, when $N_{TR}=128$ or more, the BEER, decreases gradually. This is because since the universal time-domain window transition duration becomes long, a deterioration in reception quality due to the ISI components which leak into the adjacent symbols and the ICI components which are caused by them becomes dominant rather than the improvement effect of the transport electric power efficiency owing to the suppression of the out-of-band radiation electric power. By introducing the reception side universal time-domain window, the ISI components and the ICI components can be reduced and it will be understood that the BER can be improved by about 10 times in the case where the number of turbo decoding iteration times is equal to 5 and $N_{TR}=512$. When comparing the conventional OFDM ($N_{TR}=0$) and the UTW-OFDM ($N_{TR}=512$) under the same conditions, there is only a difference of up to about 0.1 dB as a desired $E_b/N_0$ at which the BER of $10^{-6}$ is accomplished. According to the proposed UTW-OFDM system, the out-of-band radiation electric power in the Band-edge can be improved by about 75 dB in exchange for the difference of about 0.1 dB of such a desired $E_b/N_0$, so that there is a very large effectiveness. Since the UTW-OFDM has essentially the same signal generation principle as that of the conventional OFDM and can accomplish the foregoing characteristics merely by adding the very simple signal process, it has a very high compatibility in the whole communication system based on the present various kinds of OFDM.

Although the embodiments of the present invention have specifically been described above, the invention is not limited to each of the foregoing embodiments but various modifications based on the technical idea of the invention are possible.

REFERENCE SIGNS LIST

1 Physical layer scheduler
2 Channel coding unit
3 Interleaving circuit
4 Modulation unit
5 Subcarrier mapping circuit
$B_1$~$B_M$ Transmission unit
$SB_1$~$SB_X$ Transmission processing unit
11 IFFT circuit
12 GI/OM insertion circuit
13 Time-domain windowing processing unit
25 Time-domain windowing processing unit
26 FFT circuit

The invention claimed is:

1. A transmitter using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system, wherein:
   one or a plurality of transmission units are provided in parallel at a post stage of a subcarrier mapping circuit in correspondence to one or a plurality of frequency bands;
   one or a plurality of transmission processing units are provided in parallel for each of the transmission units in correspondence to one or a plurality of channels;
   the transmission processing unit has an inverse fast Fourier transforming circuit or a discrete inverse Fourier transforming circuit, a guard interval (GI) and overlap margin (OM) insertion circuit, and a time-domain windowing processing unit;
   the time-domain windowing processing unit multiplies a universal time-domain window function in accordance with a spectrum mask and transport electric power which are required in each channel, thereby suppressing out-of-band radiation electric power for every channel of the one or plurality of channels; and
   a kind and a window transition duration of the universal time-domain window function can be arbitrarily set for every channel of the one or plurality of channels.

2. A transmitter according to claim 1, wherein the time-domain windowing processing unit multiplies a universal signal amplitude standardization coefficient so that transport electric power control in a baseband can be made.

3. A transmitter according to claim 1, further comprising a summing circuit for synthesizing a plurality of transmission processing units, and wherein an output of the summing circuit is transmitted in a wireless or wired manner.

4. A transmitter according to claim 1, wherein a frequency shift can be arbitrarily set for every channel in accordance with channel requirements.

5. A transmission method using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system, wherein:
   one or a plurality of transmission units are provided in parallel at a post stage of a subcarrier mapping circuit in correspondence to one or a plurality of frequency bands;
   one or a plurality of transmission processing units are provided in parallel for each of the transmission units in correspondence to one or a plurality of channels;
   an inverse fast Fourier transforming process or a discrete inverse Fourier transforming process, a guard interval (GI) and OM inserting process, and a time-domain windowing process are sequentially executed by the transmission processing unit;
   the time-domain windowing process is executed by multiplying a universal time-domain window function in accordance with a spectrum mask and transport electric power which are required in each channel, thereby suppressing out-of-band radiation electric power for every channel of the one or plurality of channels; and
   a kind and a window transition duration of the universal time-domain window function can be arbitrarily set for every channel of the one or plurality of channels.

6. A receiver using a channel aggregation in which available channels existing in various frequency bands are bound and transmitted and using an Orthogonal Frequency Division Multiplexing (OFDM), an Orthogonal Frequency Division Multiple Access (OFDMA), or a system similar to them as a modulation system, wherein:
   one or a plurality of reception units are provided in parallel in correspondence to one or a plurality of frequency bands;
   one or a plurality of reception processing units are provided in parallel for each of the reception units in correspondence to one or a plurality of channels;
   the reception processing unit has a guard interval (GI) removing unit, a time-domain windowing processing unit, and a fast Fourier transforming circuit;
   the time-domain windowing processing unit multiplies a universal time-domain window function in accordance with a spectrum mask and transport electric power which are required in each channel, thereby suppressing out-of-band radiation electric power for every channel of the one or plurality of channels; and
   a kind and a window transition duration of the universal time-domain window function can be set to the same kind and duration as those on a transmission side.

* * * * *